United States Patent [19]
Hochschild

[11] 3,819,480
[45] June 25, 1974

[54] COMPOSITION OF METHIONINE WITH 2-DIMETHYLAMINOETHANOL

[76] Inventor: Richard Hochschild, 2915 Pebble Dr., Corona Del Mar, Calif. 92625

[22] Filed: Sept. 21, 1972

[21] Appl. No.: 290,791

Related U.S. Application Data

[63] Continuation-in-part of Ser. No. 261,711, June 12, 1972, which is a continuation-in-part of Ser. No. 133,985, April 14, 1971, which is a continuation-in-part of Ser. Nos. 857,207, Sept. 11, 1969, abandoned, and Ser. No. 4,103, Jan. 19, 1970, abandoned, and Ser. No. 4,426, Jan. 20, 1970, abandoned, and Ser. No. 4,766, Jan. 21, 1970, abandoned, and Ser. No. 5,127, Jan. 22, 1970, abandoned, and a continuation-in-part of Ser. No. 108,194, Jan. 20, 1971, which is a continuation-in-part of Ser. No. 855,418, Sept. 4, 1969, abandoned.

[52] U.S. Cl.................. 195/1.8, 195/1.7, 424/325, 424/309
[51] Int. Cl............................................ A61k 17/00
[58] Field of Search................................... 195/1.8

Primary Examiner—Richard L. Huff
Attorney, Agent, or Firm—Thomas H. Jones

[57] ABSTRACT

A therapeutic composition of methionine with 2-dimethylaminoethanol in aqueous media. A method of extending life span in animals and the survival time of cells, tissues and organs in vitro by treatment with a mixture of methionine and 2-dimethylaminoethanol or materials which form 2-dimethylamino-ethanol in aqueous media.

8 Claims, No Drawings

COMPOSITION OF METHIONINE WITH 2-DIMETHYLAMINOETHANOL

This is a continuation-in-part application of copending United States Patent Application Ser. No. 261,711, filed June 12, 1972 which is in turn a continuation-in-part of copending application Ser. No. 133,985, filed Apr. 14, 1971 which is in turn a continuation-in-part of the following now abandoned prior applications: Ser. No. 857,207, filed Sept. 11, 1969; Ser. No. 4,103, filed Jan. 19, 1970; Ser. No. 4,426, filed Jan. 20, 1970; Ser. No. 4,766, filed Jan. 21, 1970, and Ser. No. 5,127, filed Jan. 22, 1970; and a continuation-in-part of copending application Ser. No. 108,194, filed Jan. 20, 1971 which is a continuation-in-part of abandoned application Ser. No. 855,418, filed Sept. 4, 1969.

This invention relates to novel compositions containing methionine and 2-dimethylaminoethanol, its pharmaceutically acceptable acid addition salts, or pharmaceutically acceptable materials which form 2-dimethylaminoethanol in aqueous media. It has been found that such compositions are capable of extending life span in animals and of extending the in vitro survival time of animal cells, tissues and organs, such as transplant tissues and organs. The method of extending animal life span comprises the administration to the host animal of therapeutic doses of methionine and 2-dimethylaminoethanol, its acid-addition salts or materials which form 2-dimethylaminoethanol in aqueous media, while the method of preserving cells, tissues and organs comprises treating the cells, tissues or organs with an effective concentration of methionine and 2-dimethylaminoethanol, its acid-addition salts or materials which form 2-dimethylaminoethanol in aqueous media.

Although life extension in animals and man has been the subject of intensive study in the field of gerontology in recent years, there has been no prior report of any drug which has extended the life span of normal, healthy animals in a properly controlled study to an acceptable degree of statistical significance. The identification of such a life-extending agent therefore represents a significant contribution to the science of gerontology and also has important social consequences.

I have discovered that simultaneous administration of methionine and 2-dimethylaminoethanol (deanol), its acid-addition salts or materials which form 2-dimethylaminoethanol in aqueous media is capable of extending animal life span when administration is continued over a considerable portion of the animal's normal life span. Life extensions exceeding 20 percent of the period of administration are obtained at conventional therapeutic dosage levels with a statistical confidence level exceeding 95 percent.

2-Dimethylaminoethanol (deanol) has been known for many years and is described in greater detail in the following publications:

Carl C. Pfeiffer, et al., "A Critical Survey of Possible Biochemical Stimulants," Psychopharmacology — A Review of Progress 1957–1967, American College of Neuropharmacology, Editor, D. H. Efron, Public Health Service Publication No. 1836, Washington, D.C., 1968.

U.S. Pat. No. 3,088,871, Pfeiffer, May 7, 1963.

C. C. Pfeiffer, "Deanol: a Biochemical Stimulant," The Modern Hospital, 91, 120–126, November 1958.

J. Jacobs, "A Controlled Trial of Deaner and a Placebo in Mentally Defective Children," Brit.J. Clinical Practice 19, No. 2, 77–86 (1965)

The prior use of 2-dimethylaminoethanol and its acid-addition salts has been primarily in children for the treatment of behavioral disorders and learning problems. According to the above-cited references by Pfeiffer, 2-dimethylaminoethanol and its acid-addition salts are also reported to increase mental concentration and muscle tone, relieve mental depression, increase peripheral circulation, reduce chronic fatigue, improve mood, create a feeling of well-being, intensify sleep, and increase daytime energy.

Methionine is an amino acid. A lipotropic agent, its most common medicinal uses are in the treatment of liver disease (e.g., fatty liver, cirrhosis) and as a means of urinary acidification in combatting urinary tract infections in adults and diaper rash in infants.

Three forms of methionine are known; namely, L-methionine (the levorotatory isomer), D-methionine (the dextrorotatory isomer) and DL-methionine (the racemate, consisting of an equal mixture of the D and L antipodes).

No absolute contraindications are known for either 2-dimethylaminoethanol or methionine. Neither sensitization nor serious side effects have been reported in the use of either compound, both of which appear to be exceptionally nontoxic.

Evidence that methionine and 2-dimethylaminoethanol or its acid-addition salts extends animal life span, or may be used to extend survival time of cells, tissues and organs in vitro has not previously been reported. Despite the disclosure years ago of the above-listed therapeutic effects of 2-dimethylaminoethanol and methionine, the efficacy of these compounds in extending animal life span or the survival time of cells, tissues and organs in storage was not recognized until the present invention.

Investigation of the effect of 2-dimethylaminoethanol on life span in animals followed from my earlier observation (see prior copending application Ser. No. 133,985 and now abandoned prior application Ser. No. 4,103) that the drug 2-dimethylaminoethyl-p-chlorophenoxyacetate (also known as meclofenoxate, centrophenoxine and Lucidril) has the ability to extend life span in both fruit flies and mice. Within minutes after being dissolved in water, 2-dimethylaminoethyl-p-chlorophenoxyacetate hydrolyses into 2-dimethylaminoethanol and p-chlorophenoxyacetic acid. The former hydrolysis product has been found to be responsible for the life span extensions. Therefore, it was concluded that certain other drugs containing the 2-dimethylaminoethyl moiety share the life-extending properties resulting from administration of dimethylaminoethanol.

When converted to S-adenosylmethionine within cells, methionine serves as the methyl donor in the biosynthesis of choline from 2-dimethylaminoethanol. Although not bound by any theory, one explanation for the results obtained from the present invention is that methionine and 2-dimethylaminoethanol are each absorbed by the cells of the host animal or the cells of tissues and organs treated in vitro to produce choline within the cells and thereby to reduce the breakdown or facilitate the repair and replacement of cell and organelle membranes. Choline is essential to the biosynthesis of phospholipids which in turn are the principal constituents of cellular and subcellular membranes. I have observed that many specific cellular and organismic aging processes may be linked with breakdown of cell and organelle membranes, particularly lysosomal membranes (see copending U.S. Patent Application Ser. No. 133,985, filed Apr. 14, 1971) and that such aging process may be slowed by treatments which stabilize membranes or facilitate the repair or turnover of damaged membranes.

Other substances which may be included in the present compositions are phospholipid precursors such as serine, folic acid, inositol, glycerol, ethanolamine, vitamin B-12, sphingosine, homocysteine, cysteine, cystine, betaine and pyridoxine.

The administration of choline is relatively ineffective because choline, like other quaternary amines, does not readily pass through cellular membranes and, hence, is impeded from entering the cells. However, both methionine and 2-dimethylaminoethanol readily cross cellular membranes to participate in choline biosynthesis within cells.

In prolonging life span, the method of the present invention is practiced by administering to the host animal an effective dosage of methionine and 2-dimethylaminoethanol, its acid-addition salts, or materials which form 2dimethylaminoethanol in aqueous media. The materials are administered to the host animal via pharmaceutically acceptable routes, such as, for example, orally. Preferably, the material is administered to the host animal on a regular, relatively continuous, scheduled basis, such as one or several dosage units per day over an extended period of time such as about 0.5 percent of the host's expected average life span. The length of treatment is not critical; however, an extended treatment period sharply distinguishes the method of treatment from the normal usage of these compounds on an individual basis for a limited time period to treat specific symptoms in a host animal.

In prolonging the in vitro storage life of animal cells, tissues and organs, the method of the invention is conducted by treating the cells, tissues and organs with an effective concentration of methionine and 2-dimethylaminoethanol, its acid-addition salts or a material which forms 2-dimethylaminoethanol in aqueous media. For example, in the storage of animal blood, the blood is treated by adding the materials directly to the blood, preferably immediately following its withdrawal from the donor.

Animal tissues and organs, such as skin grafts and kidneys, are treated by perfusing the tissues and organs using a conventional physiological transplant perfusate medium containing methionine and 2-dimethylaminoethanol, its acid-addition salts, or a material which forms 2-dimethylaminoethanol in aqueous media in effective amounts in the perfusate medium. Methionine and 2-dimethylaminoethanol, its acid-addition salts, or a relatively non-toxic precursor material which forms 2-dimethylaminoethanol in an aqueous medium are present in amounts which are effective in increasing the storage life of the cells, tissues or organs in a condition suitable for infusion, transplantation or other uses such as medical diagnostic purposes, and production of enzymes and other biological substances. If the material is administered to the donor animal before removal of the cells, tissues or organs which will subsequently be stored, the storage life may be further improved. Details of the method of using drugs in typical aqueous perfusate media to lengthen the storage life of cells, tissues and organs are found in the book "Human Transplantation," edited by F. T. Rapaport and J. Dausset, published by Grune and Stratton, New York, 1968, Chapter 43, pages 675–691, and in the references appended to that chapter.

As used here, "effective dosage" or "effective concentration" are defined to mean that dosage or that concentration which exhibits no serious side effects and is found to be effective in extending the life span of the animal in question or the survival time of the cells, tissues and organs in question.

The range of effective dosages of 2-dimethylaminoethanol and methionine for extending animal life span is given in the following table in which the dosages are expressed in mg per kg of animal body weight per day.

Table I.

|  | Methionine | 2-dimethylaminoethanol |
| --- | --- | --- |
| Effective dosage range | 0.2 to 500 | 0.3 to 300 |
| Preferable range | 0.3 to 80 | 0.5 to 30 |
| Most preferred range | about 8 | about 5 |

The concentration of the mixture is a perfusate medium or in stored blood, may vary over a wide range since both methionine and 2-dimethylaminoethanol are remarkably nontoxic and can be tolerated at relatively high concentration levels. In practice, suitable concentrations of methionine and 2-dimethylaminoethanol, in a perfusate medium for the storage of cells, tissues and organs, may range from about 0.01 to about 5 mg per ml of medium, although higher concentrations can be employed. When the 2-dimethylaminoethanol is employed in the form of an acid-addition salt or a material which forms 2-dimethylaminoethanol in aqueous media, it is present in an amount sufficient to provide a concentration of 2-dimethylaminoethanol within the above-stated ranges.

The methionine and 2-dimethylaminoethanol or a precursor material which yields 2-dimethylaminoethanol in aqueous media are administered to the host animal either alone or in combination with other components such as vitamins, e.g., vitamins C and E; antioxidants approved for food or drug use; non-nutritional materials such as artificial coloring; minerals; foodstuffs of many kinds, beverages such as wine or tonic; pet foods; animal feeds, or as an ingredient in admixture with other drugs, etc. The compounds may be administered in a solid form or in admixture with aqueous ingredients such as fruit juices and the like. If administered in solid form, the compounds may contain nontoxic pharmaceutically acceptable carriers such as lactose, sucrose, powdered skimmed milk, magnesium stearate, chalk, delayed release agents, and the like. Pharmaceutical compositions containing the compounds may be in the form of tablets, capsules, solutions, powders, syrups or any other suitable form.

The present method can be practiced on the host animal at any period in its life. The longer it is practices, the greater is the effect upon extension of life span. Therefore, the method of treatment is preferably practiced on the host animal during its entire life span commencing from about the time it reaches maturity. Regardless of when the present method is commenced, it is preferable to continue the method of treatment on the host for the remainder of the host's life span.

Examples of esters or acid-addition salts of 2-dimethylaminoethanol which are suitable for the practice of this invention include the acetate, acetamidobenzoate, p-acetylaminobenzoate, acetyl-L-glutamate, adenosinate, p-aminobenzoate, gamma amino-butyrate, ortho-, meta- or para-aminosalicylate, ascorbate, benzilate, benzoate, p-chlorophenoxyacetate ester, citrate, creatinate, fumarate, glutamate, lactate, nicotinate, d-pantoate, d-pantothenate, phthalate, propionate, pyruvate, beta-resorcylate, salicylate, succinate, acid tartrate, bitartrate, and 3, 4, 5-trimethoxybenzoate salt, etc. As stated previously, any material may be employed in my method which provides 2-dimethylaminoethanol in an aqueous medium, as in the liquid medium within the host animal's digestive system.

In tests which were performed, a population of laboratory mice were divided into a control group and a test group with the control group being fed a diet containing 0.46 percent methionine (based on total weight) and the test group being fed the same diet and, in addition, having 28.6 mg of 2-dimethylaminoethanol (the acetamidobenzoate salt) added to their drinking water. The mice in the experimental group received on the average about 7 mg of 2-dimethylaminoethanol and 0.7 gm of methionine per kg of body weight per day and the mean survival time from the start of drug administration was about 48 percent greater than the mean survival time from the start of drug administration for the mice in the control group. The statistical confidence factor, P, applying to this result was 0.02, which is equivalent to 98 percent statistical confidence that the life span extension was caused by the difference in treatment and was not the spurious result of chance.

In still other tests which were conducted with laboratory mice of a different type, it was found that the mice in the test group which received both 2-dimethylaminoethanol (the p-chlorophenoxyacetate ester), and methionine had a mean survival time from the start of drug administration that was 27 percent more than the control group and a maximum survival time from the start of drug administration that was 26 percent more than the control group.

To apply the general procedure of the foregoing tests on mice to a controlled test on humans, a relatively large group of subjects is employed. The age of the subjects in the group is sufficiently advanced, e.g., an average of about 77 or older, to reduce the necessary test period, since the mortality rate of subjects in the 77-age group is about 6.8 annually (United States Life Tables — 1959 to 1961). The average age of the subjects, their age distributions, the length of the test, and the degree of improvement in mortality resulting from administration of the drug determines the number of subjects required to provide statistically significant data.

The subjects are divided equally into a test group and a control group, with each group having the same age distribution and being otherwise randomly selected from the total number of subjects. The test group then receives tablets combining DL-methionine and 2-dimethlyaminoethanol at a dosage level of about 20 to about 2,000 mg per day of DL-methionine and about 35 to about 2,000 mg per day of 2-dimethylaminoethanol, while the control group receives a placebo. Assuming an average body weight of 70 kg, the foregoing dosage rates correspond to a dosage level of about 0.3 to about 30 mg of methionine per kg of body weight per day and a dosage level of about 0.5 to about 30 mg of 2-dimethylaminoethanol per kg of body weight per day. The drug combination is thus administered (preferably in tablet form as a pharmaceutically acceptable salt of 2-dimethylaminoethanol in combination with conventional dispersing agents, binders, etc.) for a suitable period of, for example, 1 year or longer, if necessary, until the mortality data from the test is statistically significant, i.e., has a statistical significance, P, which is equivalent to an acceptable confidence level. The mortality data is determined during the trial period for both the test and control group by first determining the percentage of subjects s dying in each group during the trial period. Then, the percentage difference between the two mortality rates and the statistical significance, P, of this difference are determined. By determining the effectiveness of the drug combination in this manner, it is not necessary to continue the test until a high percentage of the people in the test and control group have died. The test is conducted in a double-blind manner with neither the administering physician nor the subject knowing whether the drug combination or placebo is being administered.

In further illustrating the invention, the following examples are presented in which all parts and percentages are by weight unless otherwise indicated.

EXAMPLE I 16 ml of human blood was drawn by venipuncture into a tube containing 2.4 ml of standard ACD (acid citrate, sodium citrate and dextrose) solution, making a total of 18.4 ml. The proportion of ACD to blood is the same as that which is characteristic of conventionally stored blood. The solution was divided into three aliquots of 6 ml each in separate test tubes. Nothing was added to the first tube and 4.52 mg of 2-dimethylaminoethanol acetamidobenzoate was added to both the second and the third tubes, corresponding to 1.5 mg of the base 2-dimethylaminoethanol (0.25 mg per ml). Additionally, 2.52 mg of methionine were added to the third tube to produce a concentration of 0.42 mg per ml. The tubes were then stored at 4° C for 29 days and were inverted daily to keep the cells in suspension.

One of the best in vitro tests for red blood cell viability is the well known osmotic fragility test, which determines the integrity of the cell membrane. In this test, whole blood is admixed with a salt solution to produce an osmotic pressure across the membrane of the blood cells due to the difference in the salt content of the blood and the lower salt content of the solution. The effect of the osmotic pressure is to impose an internal pressure on the blood cells which tends to burst the cells. The extend of bursting resulting from the test varies in an inverse relation with respect to the integrity of the cell membrane and, thus, is an accurate indication of membrane integrity.

In carrying out the above-described test, 9 tubes were prepared by adding 5 ml of a 0.65 percent solution of NaCl to each of 3 tubes, 5 ml of a 0.60 percent solution to each of 3 tubes and 5 ml of a 0.50 percent NaCl solution to each of 3 tubes. 0.020 ml from each of the three blood-containing tubes was pipetted into each of the 3 tubes corresponding to each concentration of NaCl.

The tubes were shaken to suspend the cells and allowed to incubate at room temperature for one hour. They were then centrifuged at 1,470 times gravity for approximately 2 minutes and the optical density of the clear supernatant was then recorded at 540 m$\mu$ on a Bausch and Lomb Spectronic 20 spectrophotometer. The optical density is a measure of the amount of hemoglobin released by the cells and is directly proportional to the number of cells that have lysed in the salt solution. The percentage of lysed cells corresponding to each measurement was determined from a previously prepared calibration curve of transmittance versus percent of lysis. The following results were obtained:

OSMOTIC FRAGILITY

| Concentration of 2-dimethyl-aminoethanol (mg/ml) | Concentration of DL-methionine (mg/ml) | Concentration (wt. percent) of NaCl solution | Percent transmittance at 540 m$\mu$ (distilled water = 100) | Equivalent percent of red blood cells lysed | Percent of control lysis |
|---|---|---|---|---|---|
| 0 (control) | 0 | 0.65 | 82 | 22 | 100 |
| | | .60 | 75 | 31 | 100 |
| | | .50 | 58 | 61 | 100 |
| 0.25 | 0 | .65 | 88 | 13 | 59 |
| | | .60 | 81 | 23 | 74 |
| | | .50 | 60 | 57 | 93 |
| 0.25 | 0.42 | .65 | 91 | 9 | 41 |
| | | .60 | 85 | 17 | 55 |
| | | .50 | 62 | 53 | 87 |

As shown by the above data, the incubated blood which contained 2-dimethylaminoethanol had a reduced lysis of red blood cells in the salt solutions as compared with the incubated blood which did not contain 2-dimethylaminoethanol. The difference in the blood stabilities was most marked at the higher salt concentrations of 0.65 and 0.60 percent.

The incubated blood samples which contained both 2-dimethylaminoethanol and DL-methionine were found to have even greater stability than the samples which contained only 2-dimethylaminoethanol and far greater stability than the control samples. The increased stability of the samples containing both 2-dimethylaminoethanol and methionine was most apparent at the higher salt concentrations of 0.65 and 0.60 percent. The osmotic pressure imposed on the blood cells is, of course, lower at the more concentrated salt solutions of 0.65 and 0.60 percent since there is less of a salt concentration gradient across the cell membranes. These data demonstrate that the survival time of whole blood can be appreciably extended by the addition of 2-dimethylaminoethanol and methionine to the storage medium.

EXAMPLE II 112 ml of human blood was drawn by venipuncture into a flask containing 16.9 ml of standard ACD (acid citrate, sodium citrate and dextrose) solution, making a total of 128.9 ml. The proportion of ACD to blood is the same as that which is characteristic of conventionally stored blood. The solution was divided into 20 aliquots of 6 ml each in separate culture tubes with screw caps. The tubes were grouped in 5 sets of 4 tubes each. Nothing was added to the four tubes in the first set, this set being the control tubes. Dimethylaminoethanol acetamidobenzoate and DL-methionine were added to the remaining tubes at various concentrations, as listed below, with the concentrations of the former being listed as weight of base. The concentrations were identical for the 4 tubes in each set, but differed from one set to the next.

The tubes were then stored at 4° C for 39 days and inverted once daily to resuspend the cells.

As red blood cells die and lyse, hemoglobin is released into the serum in which the cells are suspended. Red blood cell hemolysis was determined on the 39th day by centrifuging the tubes at 1,470 times gravity for about 10 minutes. 0.25 ml of the supernatant (serum) was withdrawn from each tube and diluted 20:1 in 4.75 ml of 0.85 percent saline solution to make 5 ml. The resulting solutions were centrifuged at 1,470 times gravity for approximately 2 minutes to remove any remaining suspended matter.

The optical density of the resulting solutions was then measured at 540 m$\mu$ on a Bausch and Lomb Spectronic 20 spectrophotometer. The optical density is a measure of the amount of hemoglobin released by the cells and is directly proportional to the number of cells that have died and lysed. The measured transmittances of the four tubes in each set were averaged and the percentage of cells lysed corresponding to each such average was determined from a previously prepared calibration curve of transmittance versus percent of lysis. The following results were obtained:

| Concentration of 2-dimethyl-aminoethanol (mg/ml) | Concentration of DL-methionine (mg/ml) | % Transmittance at 540 $\mu$ (distilled water = 100) (average of 4 tubes) | Equivalent % of red blood cells lysed | % of control lysis |
|---|---|---|---|---|
| 0 (control) | 0 | 72.8 | 3.82 | 100 |
| .25 | .42 | 77.3 | 3.05 | 80 |
| .5 | .84 | 79.0 | 2.80 | 73 |
| 1 | 1.67 | 79.8 | 2.70 | 71 |
| 2 | 3.35 | 78.0 | 2.98 | 78 |

These results demonstrate that the survival time of whole blood under the described storage conditions can be appreciably extended by the addition of 2-dimethylaminoethanol acetamidobenzoate and DL-methionine to the whole blood.

EXAMPLE III

Dried filled capsules containing 100 mg (weight of base) of 2-dimethylaminoethanol as the bitartrate salt and 100 mg DL-methionine per capsule are prepared as follows:

| Compound | Per Capsule mg |
|---|---|
| 2-dimethylaminoethanol bitartrate | 100 (weight of base) |
| DL-methionine | 100 |
| Lactose | 150 |
| Magnesium stearate | 10 |

2-Dimethylaminoethanol bitartrate and DL-methionine (both reduced to a No. 60 powder), lactose and magnesium stearate are passed through a No. 60 bolting cloth and are admixed for 10 minutes and then filled into No. 1 dry gelatine capsules.

Similar dry filled capsules can be prepared by substituting for the bitartrate salt of 2-dimethylaminoethanol any of the other aforementioned salts of 2-dimethylaminoethanol or by substituting L-methionine for DL-methionine.

EXAMPLE IV

Compressed tablets containing 301 mg of 2-dimethylaminoethanol acetamidobenzoate (equivalent to 100 mg of 2-dimethylaminoethanol) and 100 mg DL-methionine are prepared by mixing 3.01 gm of 2-dimethylaminoethanol acetamidobenzoate, 100 gm of DL-methionine, 259 gm of mannitol (reduced to a No. 60 powder) and 4.5 gm of starch (as a 12-1/2 percent paste with water). After the mixture is thoroughly mixed, it is then granulated. While moist, the granulate is passed through a No. 14 screen and then dried at 45° C in an oven. After thorough drying, the material is passed several times through a No. 14 screen and 2 grams of cornstarch are passed through a No. 90 bolting cloth onto the granulate and blended, whereafter 13 gm of magnesium stearate is passed through a No. 60 bolting cloth onto the granulate and thoroughly blended therewith. The material is then compressed into tablets, each weighing 679.5 mg and coated with a conventional tablet coating material such as calcium sulfate, calcium carbonate, gum acacia, sugar (e.g., sucrose), or methyl cellulose to seal the tablet and to reduce any undesirable odor from the methionine. The above tablet size provides a convenient dosage unit where one or several tablets may be taken each day.

The above formulation can be employed to prepare compressed tablets containing L-methionine or other salts of 2-dimethylaminoethanol in providing tablets of a convenient dosage unit. Also, if desired, tablets may be conveniently formed in which the tablet has a layered construction with methionine and a salt of 2-dimethylaminoethanol in separate layers separated by a conventional delayed release material. For example, in a layered tablet, the outer tablet surface may comprise a layer of DL-methionine with a delay release layer separating the outer surface from an inner core of 2-dimethylaminoethanol p-acetamidobenzoate. By providing a delay release material between the active ingredients, the active ingredients may be released sequentially into the system of the host animal to provide for optimum usage rate or retention time within the host's system. Also, for ease of administration, the tablet may have an elongated or capsular type of shape which makes it easier to swallow.

In the compositions and method of the invention, as discussed previously, the molar ratio of methionine to 2-dimethylaminoethanol or the 2-dimethylaminoethanol moiety in a pharmaceutically acceptable salt or precursor material forming 2-dimethylaminoethanol in aqueous media may range from about 0.1:1 to about 10:1.

In further illustrating the application of the invention to the preservation of cells, tissues and organs, there is presented the following Example regarding the preservation of human eyelid skin.

EXAMPLE V

Human eyelid skin as obtained within one hour after blepharoplasty, cut into 3 approximately equal pieces and stored at 4° C in individual culture tubes containing approximately 3 ml of Eagle's Minimum Essential Medium, to which had been added 10 percent calf serum, 50 units of penicillin/ml and 50 units of streptomycin/ml.

Additionally, 2-dimethylaminoethanol acetamidobenzoate and DL-methionine were added to the culture medium in concentrations as shown in the table below. Concentrations are expressed in mg/ml of medium and, in the case of 2-dimethylaminoethanol acetamidobenzoate, are in terms of weight of the base.

| Sample No. | 2-dimethylaminoethanol (mg/ml) | DL-methionine (mg/ml) |
|---|---|---|
| 1 (control) | 0 | 0 |
| 2 | .1 | 0 |
| 3 | .1 | .05 |

After 54 days in storage, the skin samples were fixed in phosphate buffered formalin and Bouin's fixative, dehydrated, embedded in paraffin and then sectioned and stained. The stains used were eosin, a red protein stain, and hematoxylin, a blue nucleic acid stain. The skin samples were then examined microscopically and graded on a scale from 1 to 4 for the parameters of skin viability listed in the table below. A grade of 4 corresponds to the best level of preservation, 1 to the poorest level. Grades for all parameters are totalled for each skin sample to provide an overall index of viability. The following results were obtained:

| PARAMETER | Sample 1 | Sample 2 | Sample 3 |
|---|---|---|---|
| Cell morphology | | | |
| Epidermis: | | | |
| staining of nuclei | 3 | 4 | 4 |
| vesticulation of cytoplasm | 3 | 4 | 4 |
| Hair follicles | | | |
| staining of nuclei | 4 | 4 | 4 |
| vesticulation of cytoplasm | 4 | 4 | 4 |
| Connective tissue | | | |
| perifollicular edema | 3 | 3 | 4 |
| sub-epidermal edema | 3 | 3 | 4 |
| intercollagenous edema | 2 | 2 | 4 |
| presence of fibroblast nuclei | 3 | 3 | 4 |
| TOTAL | 25 | 27 | 32 |

It is evident that the addition of 2-dimethylaminoethanol acetamidobenzoate to the culture medium, at the concentration shown, has a beneficial effect on preserving skin in vitro, particularly the cells of the epidermis. If DL-methionine is added in addition to 2-dimethylaminoethanol acetamidobenzoate, the beneficial effect is further increased, not only with respect to cells of the epidermis but also the characteristics of the deeper, connective tissue layers of the skin. It is concluded that 2-dimethylaminoethanol, alone and particularly in combination with methionine, has a beneficial effect on reducing skin aging.

As demonstrated, the present invention provides a composition and method which reduces the rate of aging in animals. In another application, the invention finds use in increasing the storage life of cells, tissues and organs in a state suitable for infusion or implantation. These results have great significance and represent a substantial achievement for mankind.

I claim:

1. Blood in a stored condition having an extended storage life and containing active ingredients which are methionine and 2-dimethylaminoethanol, a pharmaceutically acceptable acid-addition salt of 2-dimethylaminoethanol, or a pharmaceutically acceptable precursor material which forms 2- dimethylaminoethanol in an aqueous medium with the active ingredients being present in an amount which is effective to extend the storage life of the blood in a condition suitable for transfusion.

2. The composition of claim 1 wherein the methionine is DL-methionine.

3. The composition of claim 1 wherein the molar ratio of methionine to 2-dimethylaminoethanol or to the 2-dimethylaminoethanol moiety in a pharmaceutically acceptable salt of 2-dimethylaminoethanol or a pharmaceutically acceptable material which forms 2-dimethylaminoethanol in aqueous media is about 0.1:1 to about 10:1.

4. The composition of claim 3 wherein the methionine is DL-methionine.

5. The composition of claim 1 wherein the concentration of 2-dimethylaminoethanol or the 2-dimethylaminoethanol moiety in a pharmaceutically acceptable salt of 2-dimethylaminoethanol or a pharmaceutically acceptable material which forms 2-dimethylaminoethanol in aqueous media is about 0.01 to about 5 mg per ml.

6. The composition of claim 5 wherein the said concentration is about 0.01 to about 2 mg per ml.

7. The composition of claim 5 wherein the methionine is DL-methionine.

8. The composition of claim 6 wherein the methionine is DL-methionine.

* * * * *